US008721497B2

(12) United States Patent
Beak

(10) Patent No.: US 8,721,497 B2
(45) Date of Patent: May 13, 2014

(54) AUTOMATIC SPEED CONTROL SYSTEM FOR MANUAL TRANSMISSION

(75) Inventor: Jung Ho Beak, Gimhae (KR)

(73) Assignee: Donghwan Ind. Corp., Changwon-si, Gyeongsangnam-do (KR)

( * ) Notice: Subject to any disclaimer, the term of this patent is extended or adjusted under 35 U.S.C. 154(b) by 24 days.

(21) Appl. No.: 13/520,892

(22) PCT Filed: Dec. 30, 2010

(86) PCT No.: PCT/KR2010/009581
§ 371 (c)(1),
(2), (4) Date: Jul. 6, 2012

(87) PCT Pub. No.: WO2011/083935
PCT Pub. Date: Jul. 14, 2011

(65) Prior Publication Data
US 2013/0072349 A1    Mar. 21, 2013

(30) Foreign Application Priority Data

Jan. 6, 2010  (KR) .......................... 10-2010-000739

(51) Int. Cl.
*B60W 10/10*   (2012.01)
(52) U.S. Cl.
USPC ............................................. 477/80; 477/84

(58) Field of Classification Search
None
See application file for complete search history.

(56) References Cited

U.S. PATENT DOCUMENTS

| | | | | |
|---|---|---|---|---|
| 3,433,101 | A | * | 3/1969 | Eichler et al. .................... 477/84 |
| 4,817,468 | A | * | 4/1989 | Leigh-Monstevens et al. 74/335 |
| 4,981,202 | A | * | 1/1991 | Leigh-Monstevens et al. 477/78 |
| 5,219,391 | A | * | 6/1993 | Edelen et al. .................... 74/335 |
| 5,285,360 | A | * | 2/1994 | Kanner ......................... 362/524 |
| 6,019,009 | A | * | 2/2000 | Lee ................................ 74/335 |
| 2002/0056601 | A1 | * | 5/2002 | Inoue ........................... 192/3.62 |
| 2013/0072349 | A1 | * | 3/2013 | Beak ............................... 477/84 |

FOREIGN PATENT DOCUMENTS

KR  10-2005-0101973 A   10/2005
KR  10-2006-0073723 A   6/2006

* cited by examiner

*Primary Examiner* — David D Le
*Assistant Examiner* — Steven B Christ
(74) *Attorney, Agent, or Firm* — Sherr & Jiang, PLLC

(57) ABSTRACT

Disclosed therein is an automatic speed control system for a manual transmission. Clutch operating means using a combination of a motor and gears, transmission lever operating means using a combination of a motor and gears, and a control part, which check a driving state of a vehicle in real time and controls the motor if gear-shifting is needed, are additionally mounted to a general manual transmission, so that the general manual transmission can automatically shift the gear like an automatic transmission.

8 Claims, 6 Drawing Sheets

AUTOMATIC SPEED CONTROL SYSTEM FOR MANUAL TRANSMISSION

CROSS REFERENCE TO PRIOR APPLICATIONS

This application is a National Stage Patent Application of PCT International Patent Application No. PCT/KR2010/009581 (filed on Dec. 30, 2010) under 35 §371, which claims priority to Korean Patent Application Nos. 10-2010-0000739 (filed on Jan. 6, 2010), which are all hereby incorporated by reference in their entirety.

TECHNICAL FIELD

The present invention relates to a transmission for a vehicle, and more particularly, to an automatic speed control system for a manual transmission, which can automatically convert a gear engagement according to a traveling state of the vehicle.

BACKGROUND ART

A manual transmission out of various transmissions for vehicles is relatively inexpensive and gives users satisfaction of good fuel efficiency and dynamic driving. However, the manual transmission has several problems in that driving maneuvers are complicated and a driver's fatigue is increased when the driver drives for a long time because the driver have to always steps a clutch pedal and operates a gear shift in order to shift a gear.

In order to solve the above-mentioned problems, automatic transmissions have been developed and used, but the automatic transmissions are expensive and high in fuel consumption, but are difficult to satisfy drivers, who want dynamic driving, because the automatic transmissions are lower in sudden acceleration effect than the manual transmission.

Accordingly, people need a new transmission that has the structure and merits of the manual transmission as they are and also has merits of the automatic transmission.

DISCLOSURE

Technical Problem

Accordingly, the present invention has been made in an effort to solve the above-mentioned problems occurring in the prior arts, and it is an object of the present invention to provide an automatic speed control system for a manual transmission, which can automatically shift a gear according to speed of a vehicle and minimize the number of components.

It is another object of the present invention to provide an automatic speed control system for a manual transmission, which can substitute for an automatic transmission by being simply mounted on a case of a manual transmission without replacing the manual transmission.

Technical Solution

To achieve the above objects, the present invention provides an automatic speed control system for a manual transmission, which includes a clutch operated by a clutch lever and a manual gear-shifting part shifting a gear by a control shaft, the automatic speed control system including: clutch operating means for operating the clutch lever so as to selectively separate the manual gear-shifting part from a rotary power of an engine; control shaft operating means for operating the control shaft to shift a manual gear of the manual gear-shifting part when the manual gear-shifting part is separated from the rotary power of the engine by the clutch operating means; and a control part automatically shifting a gear of the manual transmission through the steps of checking a driving state of a vehicle in real time, controlling the clutch operating means if gear-shifting is needed, and controlling the control shaft operating means.

Preferably, the control part measures at least one selected from speed and engine rpm of the vehicle, rpm acceleration position of a driving shaft, whether or not a brake is operated, and a position of the gear in real time.

Moreover, the clutch operating means includes: a worm rotatably disposed on a frame and rotated by a driving motor; a worm gear geared with the worm to transfer a rotary power in a perpendicular direction; a pinion gear located on the same axis in such a way as to be rotated in the same way as the worm gear; and a rack gear geared to the pinion gear and moved in a straight line so as to operate the clutch lever.

Furthermore, the driving motor includes a low speed sensor, which measures rpm and transfers the measured value to the control part.

Additionally, the frame includes a position sensor is disposed on a rotary shaft of the worm so as to measure rpm of the worm gear or the pinion gear and transfer the measured value to the control part.

In addition, the control shaft operating means includes: selector operating means rotating an operation gear fixed at an end portion of the control shaft at a predetermined angle to thereby rotate the control shaft relative to a central axis thereof; and shift operating means moving the operation gear in a central axis direction to thereby move the control shaft in a longitudinal direction.

Moreover, the selector operating means includes: a worm rotatably disposed on a fixed block and rotated by a driving motor; a worm gear geared with the worm to transfer a rotary power in a perpendicular direction; and a connection gear located on the same axis so as to be rotated in the same way as the worm gear.

Furthermore, the shift operating means includes: a worm rotatably disposed on a fixed block and rotated by a driving motor; a worm gear geared with the worm to transfer a rotary power in a perpendicular direction; a pinion gear located on the same axis so as to be rotated in the same way as the worm gear; and a movable shaft having a rack gear geared with the pinion gear and moving along a longitudinal direction thereof, the movable shaft being rotatably connected to a shaft of the control shaft.

Additionally, the selector operating means and the shift operating means respectively include position sensors to measure rpm of each unit and transfer the measured value to the control part.

Advantageous Effects

As described above, the automatic speed control system for a manual transmission according to the present invention carries out an automatic gear-shifting function with a relatively simple structure. The automatic speed control system for a manual transmission is mounted on the manual transmission at a low price without replacing the existing manual transmission of the vehicle in order to carry out the automatic gear-shifting function, so that the automatic speed control system can minimize the number of the components in comparison with the conventional automatic transmission and is simplified in work because it is simply mounted on the case of the manual transmission.

Figure 1:
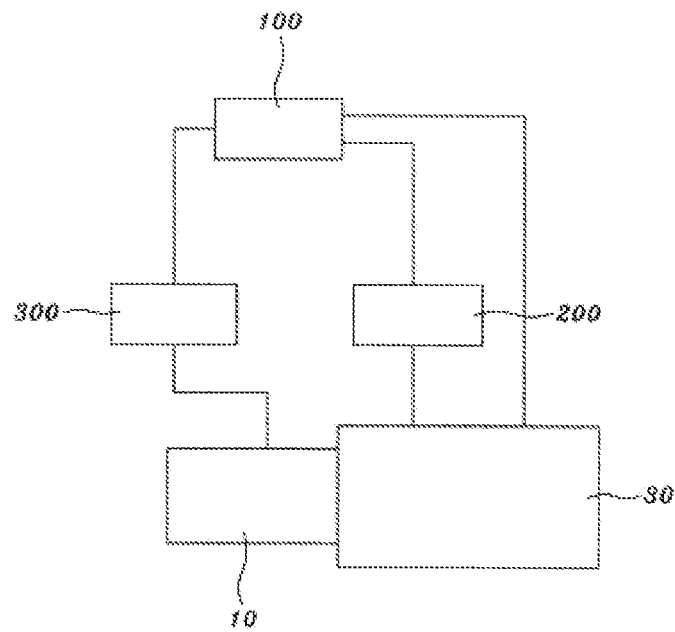
FIG. 1 is a schematic diagram of an automatic speed control system for a manual transmission according to the present invention.

<Explanation of essential reference numerals in drawings>

| | |
|---|---|
| 1: control shaft | 8: clutch lever |
| 100: control part | 200: clutch operating means |
| 210: frame | 220: worm |
| 230: worm gear | 240: pinion gear |
| 250: rack gear | 260: low speed sensor |
| 270: position sensor | |
| 300: control shaft operating means | |
| 310: selector operating means | |
| 320: shift operating means | |
| 311, 321: fixed block | 312, 322: worm |
| 313, 323: driving motor | 314, 324: worm gear |
| 315: connection gear | 316, 328: position sensor |
| 325: pinion gear | 326: movable shaft |
| 330: operation gear | |

MODE FOR INVENTION

Reference will be now made in detail to the preferred embodiment of the present invention with reference to the attached drawings.

While the present invention has been particularly shown and described with reference to exemplary embodiment thereof, it will be understood by those of ordinary skill in the art that various changes in form and details may be made therein without departing from the spirit and scope of the present invention as defined by the following claims.

Figure 2:
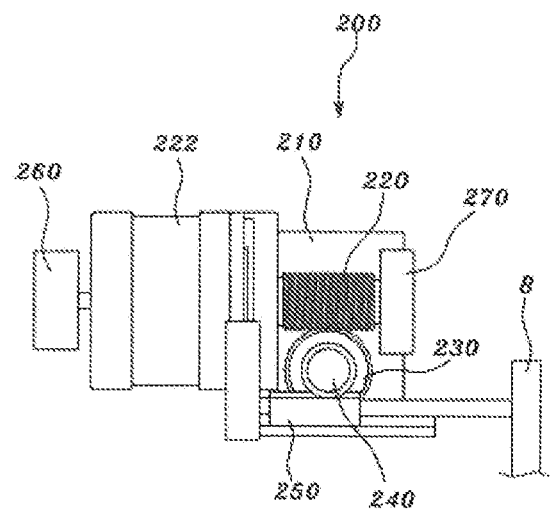
FIG. 2 is a view showing clutch operating means of the automatic speed control system for the manual transmission.
Figure 3:
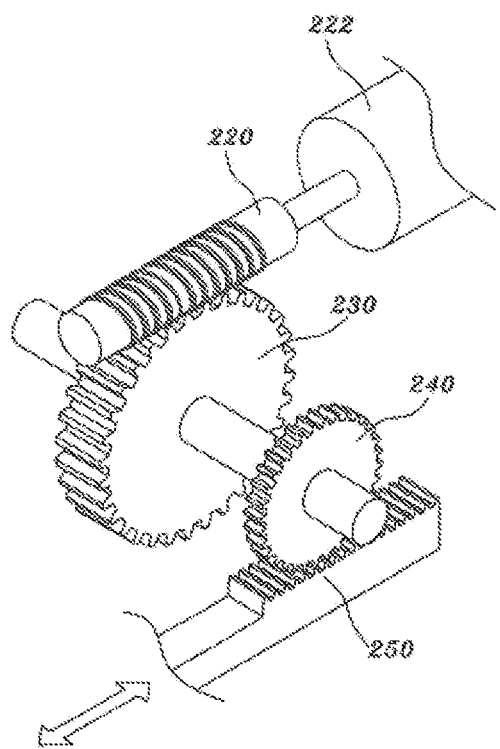
FIG. 3 is a view showing an engagement state of gears of FIG. 2.
Figure 4:
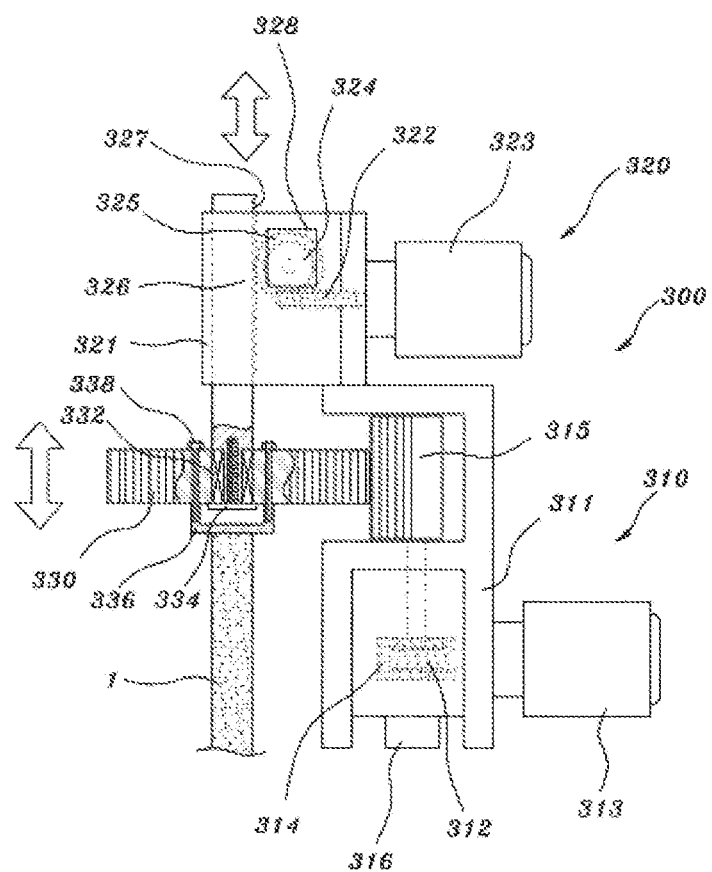
FIG. 4 is a view showing control shaft operating means of the automatic speed control system for the manual transmission.
Figure 5:
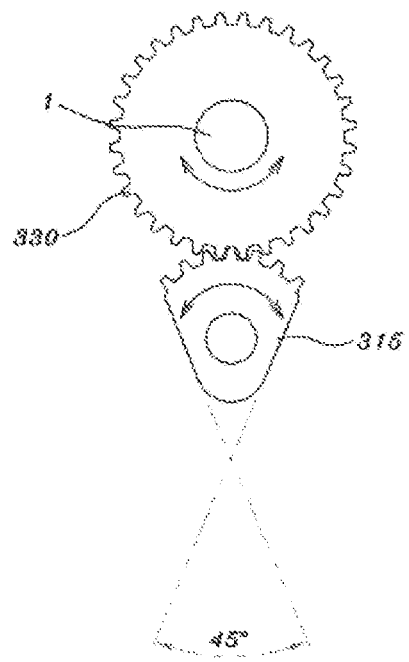
FIG. 5 is a view showing an operated state by selector operating means of FIG. 4.
Figure 6:
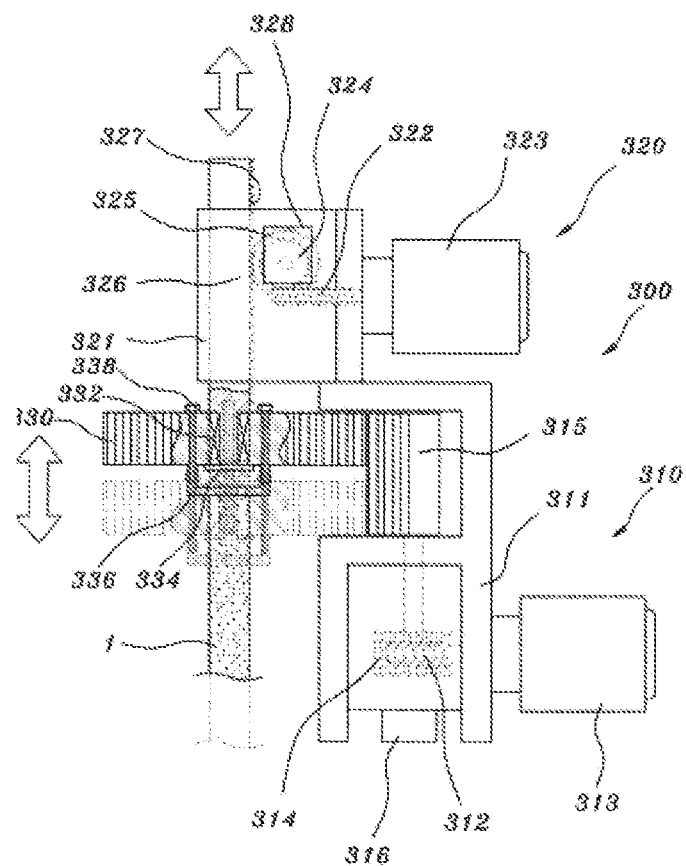
FIG. 6 is a view showing an operated state by shift operating means of FIG. 4.
Figure 7:
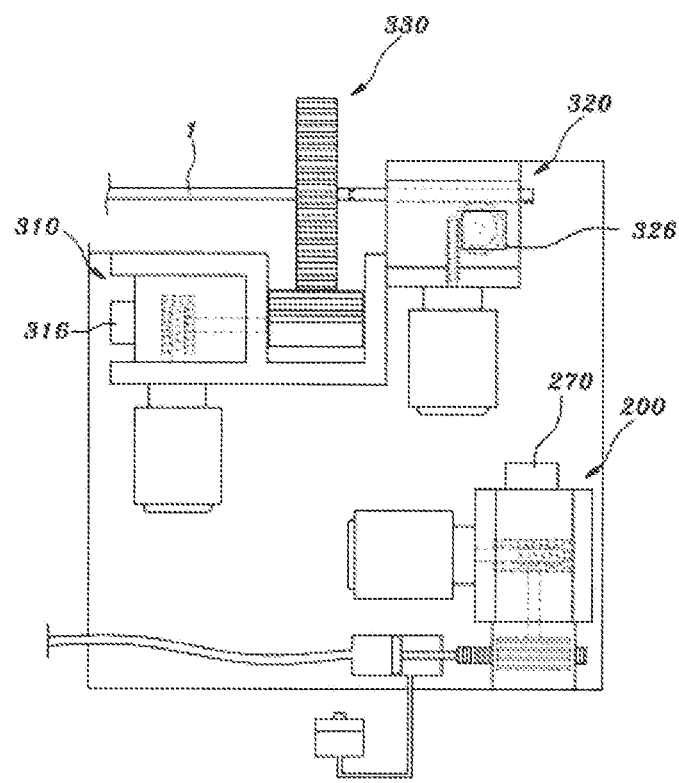
FIG. 7 is a view showing an installation state of the automatic speed control system for the manual transmission.

FIG. 1 is a schematic diagram of an automatic speed control system for a manual transmission according to the present invention, FIG. 2 is a view showing clutch operating means of the automatic speed control system for the manual transmission, FIG. 3 is a view showing an engagement state of gears of FIG. 2, FIG. 4 is a view showing control shaft operating means of the automatic speed control system for the manual transmission, FIG. 5 is a view showing an operated state by selector operating means of FIG. 4, FIG. 6 is a view showing an operated state by shift operating means of FIG. 4, and FIG. 7 is a view showing an installation state of the automatic speed control system for the manual transmission.

As shown in FIG. 1, the automatic speed control system for the manual transmission according to the present invention includes a control part 100, clutch operating means 200, and control shaft operating means 300.

First, the clutch operating means 200 operates a clutch lever 8 to selectively separate a clutch disk from a rotary power of an engine 30, and the control shaft operating means 300 operates a control shaft 1 to shift a manual gear when the clutch disk is separated from the rotary power of the engine by the clutch operating means 200.

Moreover, the control part 100 checks a driving state of a vehicle in real time, and if a gear shift is needed, controls the clutch operating means 200, and then, controls the control shaft operating means 300 so as to automatically shift a gear of the manual transmission 10.

The control unit 100 measures at least one selected from speed and engine rpm of the vehicle, rpm acceleration position of a driving shaft, whether or not a brake is operated, and a position of the gear in real time, and then, controls the clutch operating means 200 and the control shaft operating means 300.

Furthermore, the control part 100 measures operation conditions of components of the vehicle and controls the clutch operating means 200 and the control shaft operating means 300, and hence, for this, each component of the vehicle has a sensor.

In other words, there are an acceleration sensor for measuring an operation position of an accelerator of the vehicle, a low speed sensor for checking a continuous low speed state of the vehicle, a brake sensor for measuring an operation position of a brake, an engine start sensor for measuring an engine start state, a side sensor for measuring a position of a side brake, and a gear position sensor for measuring a position of the gear of a gear-shifting part.

Measurement values of the acceleration sensor, the low speed sensor, the brake sensor, the engine start sensor, the side sensor, and the gear position sensor are transferred to the control part 100 in real time, and hence, the clutch operating means 200 and the control shaft operating means 300 are easily controlled so as to automatically shift the gear. In the drawing, the sensors are not illustrated.

As shown in FIGS. 2 and 3, the clutch operating means 200 includes a frame 210, a worm 220, a worm gear 230, a pinion gear 240, and a rack gear 250.

The worm 220 is rotatably disposed on the frame 210 and rotated by a driving motor 222, and the worm gear 230 is connected to the worm 220 so as to transfer a rotary power in a perpendicular direction.

The pinion gear 240 is located on the same axis in such a way as to be rotated in the same way as the worm gear 230, and the rack gear 250 is geared to the pinion gear 240 and moves to operate the clutch lever 8.

Additionally, the driving motor 222 further includes a low speed sensor 260, and the low speed sensor 260 measures rpm of the driving motor 222 and transfers the measured value to the control part 100 to thereby control the clutch operating means 200.

In addition, the frame 210 includes a position sensor 270, and the position sensor 270 measures rpm of the worm gear 230 or the pinion gear 240 and transfers the measured value to the control part 100 to thereby control the clutch operating means 200.

In the meantime, the position sensor 270 includes a variable resistance TPS (Throttle Position Sensor) to transfer the measured value to an ECU (Electronic Control Unit), and the measured value transferred to the ECU is transferred to the control part 100 to thereby control the clutch operating means 200.

Such a position sensor 270 also measures an idling state, an acceleration state, a deceleration state, a full-load state, and so on and transfers the measured values to the ECU. The ECU transfers the values to the control part 100 to thereby more easily control the clutch operating means 200.

As shown in FIGS. 4 to 7, the control shaft operating means 300 includes an operation gear 330, selector operating means 310, and shift operating means 320.

The operation gear 330 is fixed at an end portion of the control shaft 1, and the selector operating means 310 rotates the operation gear 330 at a predetermined angle to thereby rotate the control shaft 1 relative to a central axis.

Moreover, the shift operating means 320 moves the operation gear 330 in a direction of the central axis to thereby move the control shaft 1 in a longitudinal direction.

First, the selector operating means 310 will be described. The selector operating means 310 includes a fixed block 311, a worm 312, a worm gear 314, and a connection gear 315.

The worm 312 is rotatably disposed at the fixed block 311 and rotated by a driving motor 313, and the worm gear 314 is geared to the worm 312 to transfer a rotary power in a perpendicular direction.

The connection gear 315 is located on the same axis in such a way as to be rotated in the same way as the worm gear 314, and geared with the operation gear 330 so as to rotate the operation gear 330 at a predetermined angle, so that the control shaft 1 is rotated.

Furthermore, the shift operating means 320 includes a fixed block 321, a worm 322, a worm gear 324, a pinion gear 325, and a movable shaft 326.

The worm 322 is rotatably disposed at the fixed block 321 and rotated by a driving motor 323, and the worm gear 324 is geared to the worm 322 to transfer a rotary power in a perpendicular direction.

Additionally, the pinion gear 325 is located on the same axis in such a way as to be rotated in the same way as the worm gear 324, and the movable shaft 326 has a rack gear 327 geared with the pinion gear 325 and moves in a longitudinal direction.

In this instance, the operation gear 330 is rotatably connected to an end portion of the movable shaft 326, and hence, is rotated relative to a central axis thereof.

The operation gear 330 is connected to the control shaft 1 by an operation bearing 332 and a first fixing member 334 and a fixing bracket 336 and a second fixing member 338.

The operation bearing 332 is disposed between the operation gear 330 and the movable shaft 326 so that the operation gear 330 is rotatable, and the first fixing member 334 combines the operation gear 330 to the movable shaft 326.

In other words, the operation gear 330 is rotatably joined to the movable shaft 326 in such a way as to be prevented from being separated by the first fixing member 334.

In addition, the fixing bracket 336 and the second fixing member 338 are provided to fix the operation gear 330 and the control shaft 1. The fixing bracket 336 is fixed to the control shaft 1 so as to rotate in the same way as the control shaft 1, and is fixed to the operation gear 330 by the second fixing member 338 so as to rotate in the same way as the selector operating means 310 when the selector operating means 310 is operated.

As described above, the operation gear 330 is rotatably disposed at an end of the movable shaft 326 of the shift operating means 310, so that the operation gear 330 can be rotated when the selector operating means 310 is operated.

Moreover, the connection gear 315 of the selector operating means 310 is longer than the thickness of the operation gear 330, so that the operation gear 330 can move along a longitudinal direction of a gear thread of the connection gear 315.

In this instance, the selector operating means 310 and the shift operating means 320 respectively further include position sensors 316 and 328, so that the position sensors 316 and 328 respectively measure rpm of the selector operating means 310 and the shift operating means 320 and transfer the measured values to the control part 100 so as to control the control shaft operating means 300 in real time.

In the meantime, the position sensors 316 and 328 respectively include variable resistance TPSs (Throttle Position Sensor) to transfer the measured values to an ECU (Electronic Control Unit), and the measured values transferred to the ECU is transferred to the control part 100 to thereby control the control shaft operating means 300.

Such position sensors 316 and 328 also measure an idling state, an acceleration state, a deceleration state, a full-load state, and so on and transfer the measured values to the ECU. The ECU transfers the values to the control part 100 to thereby more easily control the control shaft operating means 300.

As described above, the clutch lever and the control shaft 1 are operated in order by the clutch operating means 200, the control shaft operating means 300, and the control part 100 that controls the clutch operating means 200 and the control shaft operating means 300, such that the gears of the manual transmission can be automatically shifted.

The invention claimed is:

1. An automatic speed control system for a manual transmission, which includes a clutch operated by a clutch lever and a manual gear-shifting part shifting a gear by a control shaft, the automatic speed control system comprising:
   clutch operating means operating the clutch lever so as to selectively separate the manual gear-shifting part from a rotary power of an engine;
   control shaft operating means operating the control shaft to shift a manual gear of the manual gear-shifting part when the manual gear-shifting part is separated from the rotary power of the engine by the clutch operating means; and
   a control part automatically shifting a gear of the manual transmission through the steps of checking a driving state of a vehicle in real time, controlling the clutch operating means if gear-shifting is needed, and controlling the control shaft operating means,
   wherein the control shaft operating means includes selector operating means and shift operating means,
   wherein the selector operating means includes:
      an operation gear which is i) fixed at an end of the control shaft, ii) rotatable together with the control shaft in a first direction perpendicular to an axial direction of the control shaft, and iii) linearly movable together with the control shaft in a second direction which is the axial direction of the control shaft; and
      a connection gear geared with the operation gear and rotatable in the first direction within a predetermined angle range,
   wherein the shift operating means linearly moves the operation gear to move the control shaft in the second direction,
   wherein the connection gear has a rotational shaft parallel to the control shaft and a width wider than a width of the operation gear so that the operation gear slides on the connection gear in the second direction while being geared with the connection gear when the shift operating means linearly moves the operation gear in the second direction.

2. The automatic speed control system for the manual transmission according to claim 1, wherein the control part measures at least one selected from speed and engine rpm of the vehicle, rpm acceleration position of a driving shaft, whether or not a brake is operated, and a position of the gear in real time.

3. The automatic speed control system for the manual transmission according to claim 1, wherein the clutch operating means comprises:
   a worm rotatably disposed on a frame and rotated by a driving motor;
   a worm gear geared with the worm to transfer a rotary power in a perpendicular direction;
   a pinion gear located on the same axis in such a way as to be rotated in the same way as the worm gear; and
   a rack gear geared to the pinion gear and moved in a straight line so as to operate the clutch lever.

4. The automatic speed control system for the manual transmission according to claim 3, wherein the driving motor comprises a low speed sensor, which measures rpm and transfers the measured value to the control part.

5. The automatic speed control system for the manual transmission according to claim 3, wherein the frame comprises a position sensor, which measures a value in accordance with a rotational speed of the worm gear or the pinion gear and transfers the measured value to the control part to derive rpm of the worm gear or the pinion gear.

6. The automatic speed control system for the manual transmission according to claim 1, wherein the selector operating means further includes:
   a worm rotatably disposed on a fixed block and rotated by a driving motor; and
   a worm gear geared with the worm to transfer a rotary power in a perpendicular direction, wherein the worm gear shares the rotational shaft with the connection gear to rotate together in the first direction.

7. The automatic speed control system for the manual transmission according to claim 1, wherein the shift operating means comprises:
   a worm rotatably disposed on a fixed block and rotated by a driving motor;
   a worm gear geared with the worm to transfer a rotary power in a perpendicular direction;
   a pinion gear located on the same axis so as to be rotated in the same way as the worm gear; and
   a movable shaft having a rack gear geared with the pinion gear and linearly movable together with the operation gear in the second direction, wherein the movable shaft is coupled to the operation gear by a bearing so that the operation gear is rotatable together with the control shaft in the first direction with respect to the movable shaft.

8. The automatic speed control system for the manual transmission according to claim 1, wherein each of the selector operating means and the shift operating means comprises a position sensors to measure a value in accordance with a rotational speed of a rotational part in each means and transfer the measured value to the control part to derive rpm of the rotational part in each means.

* * * * *